United States Patent [19]
James

[11] Patent Number: 5,806,232
[45] Date of Patent: Sep. 15, 1998

[54] RADIO CONTROLLED FISHING BAIT BOAT

[76] Inventor: Clifton E. James, 9100 Brink Rd., Gaithersburg, Md. 20879

[21] Appl. No.: 829,903

[22] Filed: Mar. 25, 1997

[51] Int. Cl.⁶ .......................... A01K 91/02; A01K 91/08; A01K 97/00
[52] U.S. Cl. ............................................. 43/26.1; 446/154
[58] Field of Search .................... 43/26.1, 26.2; 114/21.2, 144 A, 201, 202; 446/154, 162, 165

[56] References Cited

U.S. PATENT DOCUMENTS

| | | | |
|---|---|---|---|
| 2,726,471 | 7/1955 | Uus | 43/17.5 |
| 3,203,131 | 8/1965 | Myers | 43/26.1 |
| 3,599,370 | 8/1971 | Armata et al. | 43/26.1 |
| 3,739,516 | 6/1973 | Holling | 43/26.1 |
| 3,793,761 | 2/1974 | Bonham | 43/26.1 |
| 4,161,077 | 7/1979 | Ciaccio et al. | 43/26.1 |
| 4,339,888 | 7/1982 | Sheng-Jung | 43/26.1 |
| 4,442,621 | 4/1984 | Kent | 43/26.1 |
| 4,757,633 | 7/1988 | Van Cleve | 43/26.1 |
| 5,154,016 | 10/1992 | Fedora et al. | 43/26.1 |
| 5,165,193 | 11/1992 | Dankwardt | 43/26.1 |
| 5,293,712 | 3/1994 | Lo | 43/26.1 |
| 5,309,664 | 5/1994 | Wright | 43/26.1 |
| 5,361,530 | 11/1994 | Kashani et al. | 43/26.1 |
| 5,363,587 | 11/1994 | Nordling | 43/26.1 |
| 5,581,932 | 12/1996 | Bell | 43/26.1 |

Primary Examiner—Robert P. Swiatek
Assistant Examiner—James S. Bergin
Attorney, Agent, or Firm—Evenson, McKeown, Edwards & Lenahan, P.L.L.C.

[57] ABSTRACT

A radio controlled fishing bait boat for delivering a baited fishing line to a remote location. The hull has a recessed channel on the lower side in which a propeller and a rudder are mounted. A convex deck cover covers a top portion of the hull. In the interior of the hull, battery-powered electric motors for controlling the propeller and the rudder, batteries, and a controller are arranged. Pivotable hatches are provided in the stern transom for access to bait storage compartments in the interior of the hull. A baited fishing line is loaded into the bait storage compartment. The bait boat is directed to a desired fishing location by use of a hand-held radio transmitter which sends signals to the bait boat to control its speed and direction. Once the boat has reached the desired fishing location, the fishing line is tugged to pull the baited fishing line out of the bait storage compartment and into the water. The design of the hull and the weight distribution of the boat allow the boat to duck under breaking waves to stably and effectively move through surf to a desired fishing location.

17 Claims, 6 Drawing Sheets

RADIO CONTROLLED FISHING BAIT BOAT

BACKGROUND AND SUMMARY OF THE INVENTION

The present invention is directed to a radio controlled boat for carrying fishing bait to a remote location, and more particularly to a fishing bait boat which is capable of travelling reliably through waves, including breaking waves in ocean shoreline surf and the like.

Various motorized fishing carriers for carrying bait and for trolling are known in the art. For example, U.S. Pat. No. 2,726,471 to Uus relates to a motorized fish bait and hook carrier having a generally cylindrical hollow body. A fishing line is attached to the rear end of the hollow body. A propeller mounted in front of the hollow body is powered by a battery-operated electric motor contained in the hollow body. A rib having a series of longitudinally-spaced apertures is secured to the inside surface of the upper portion of the body, with leader lines having baited hooks being secured to the apertures. A pivoted closure is secured to the bottom of the hollow body below the rib with a hinge and a latch. A float is pivotally secured to the latch which releases the latch when the float reaches a certain level, allowing the closure to pivot downwardly about the hinge. When the closure is opened, the power to the electric motor is interrupted, and the baited hooks are discharged from the hollow body and positioned below the hollow body for catching fish. Since the leader lines remain secured to the rib, the baited hooks are always attached to the hollow body. The fishing line connected to the rear end of the hollow body is used to control the bait carrier.

U.S. Pat. No. 3,793,761 to Bonham relates to a remotely steered troller having a fishing pole mounted thereon. The troller includes a top hull portion and a bottom hull portion. The bottom hull portion has twin catamaran hull portions which are of a streamlined half-ovular shape. An electric motor is mounted on the bottom hull portion and is powered by batteries which are fitted into recesses in the bottom hull portion. The output shaft of the motor extends through the bottom hull portion to a propeller positioned between the catamaran hull portions, where a propeller protection cage surrounds the propeller. The troller is steered by a rudder which is connected to a control line by way of an indexed mechanical linkage. A user controls the direction of the rudder by tugging on the control line. A short fishing pole is secured to a pole support plate mounted at the stern of the craft.

U.S. Pat. No. 5,293,712 to Lo shows a remote control fishing tackle having a separate float unit which is controlled by a radio transmitter. The float unit has an upper housing and a lower housing, forming a flying saucer shape. Two spiral propeller units are arranged in two driving water channels in the lower housing. A fishing line holder is provided to the rear end of the float unit and is connected to the main controller by a primary fishing line. A secondary fishing line with a fish hook is fastened to the fishing line holder.

U.S. Pat. Nos. 5,154,016 to Fedora et al., 5,165,193 to Dankwardt, 5,309,664 to Wright, and 5,363,587 to Nordling also relate to remote control fishing devices.

When fishing in surf, the known fishing bait carriers tend to have difficulty in making progress through the breaking waves, since they ride up or crest on the waves, which prevents progress and may cause them to capsize or greatly change direction. Furthermore, in the known fishing bait carriers that carry the bait outside of the boat, the fishing bait may be damaged or lost while being transported to the desired fishing location.

Consequently, there is a need for a radio controlled fishing bait boat which is capable of effectively and stably travelling through breaking waves to the desired fishing location, which is capable of securely protecting the bait as it is being transported to the desired location, and which can easily and reliably release the bait at the desired location.

These and other needs have been met according to the present invention by providing a radio controlled fishing bait boat comprising: a hull including a longitudinal central hull section having a lower wall, a pair of longitudinal lowered hull sections located on opposite lateral sides of the central hull section, respectively, and a rear transom, the lowered hull sections extending downwardly from the lower wall and defining a recessed channel therebetween, the hull defining an interior space, the transom including at least one bait hatch providing access to a bait storage compartment in the interior space; a convex deck cover attached to the hull and arranged to cover the interior space; a propeller arranged in the recessed channel, the propeller being operatively connected with an electric motor arranged in the interior space of the hull; a rudder arranged in the recessed channel; at least one battery arranged in the interior space of the hull and connected to the electric motor; and a control unit arranged in the interior space of the hull, the control unit operatively connected to control the propeller and the rudder in response to radio signals received by a radio receiver.

The present invention provides a fishing bait boat which is capable of effectively and stably travelling through breaking waves to the desired fishing location. The longitudinal hull with the longitudinal channel provides strong directional stability. Due to its hull design and weight distribution, the fishing bait boat according to the present invention ducks under breaking waves, allowing it to stably travel through rough surf. In other words, the bait boat travels through the wave, rather than riding over the top of the wave. This is accomplished by forming the hull with a pair of lowered hull sections extending downward from the central hull section. By placing heavy components, such as the batteries, in the hull interior in the lowered hull sections on both sides of the central hull section, the center of gravity is advantageously lowered which improves stability. This design keeps the boat submerged lower in the water, allowing it to duck under breaking waves.

The bow of the fishing bait boat hull is configured to provide lift when operating in relatively smooth water, as on lakes or in between waves. The lift is produced due to the force of the water against the curved bow as the boat moves through the water. However, when water breaks over the bow, the convex deck overcomes the lift moment, providing horizontal stability. In other words, the force of the breaking water against the convex deck provides a downward force which counteracts the lift of the bow, so that the boat will maintain a generally horizontal attitude to penetrate the breaking water, rather than riding up on the wave. When the fishing bait boat is completely covered with water the convex deck shifts the horizontal buoyancy forward to increase the angle of attack to return the boat to the surface. In other words, when the boat is submerged, the buoyancy of the convex deck will provide lift at the front of the boat to direct the boat to the surface. The convex deck also increases the buoyancy and shifts the center of gravity when submerged to maintain the boat in an upright position. The interior space of the hull is sealed from the outside, to prevent water from entering the interior space even though the boat may become completely submerged while travelling through a wave.

According to one preferred embodiment of the present invention, the freeboard of the bait boat, i.e., the distance between the water line and the deck (bottom of the convex deck cover), is within the range of 14% to 43% of the height of the side profile of the hull, (the distance between the bottom of the lowered portions and the deck—bottom of the convex deck cover), and even more preferably is within the range of 20% to 40% of the height of the side profile. A freeboard within these preferred ranges is achieved by designing the hull with the lowered hull sections and distributing the weight so that the boat is submerged deeper in the water than is the case with prior art bait boats. Although this high water line creates more water drag on the boat, the high water line is beneficial for stable travel of the bait boat through breaking waves. Since, the present invention is concerned with the ability of the boat to effectively travel through rough water, including breaking waves, and high boat travelling speeds are unnecessary, the resultant compromise is advantageous.

According to another embodiment of the present invention, the longitudinal center of gravity, $x_{cg}$, of the boat is located a distance from the transom (i.e., the rearwardly facing portion of the hull) which is within the range of 35% to 45% of the length of the side profile of the hull, and even more preferably is within the range of 38% to 40% of the length of the side profile of the hull. A longitudinal center of gravity within these preferred ranges is achieved by appropriate positioning of the components in the interior of the hull, e.g., the batteries for the electric motor. This positioning of the longitudinal center of gravity helps to prevent the bow from riding up on a wave.

According to another embodiment of the present invention, the vertical center of gravity, $y_{cg}$, of the boat is located a distance below the deck which is within the range of 40% to 50% of the height of the side profile of the hull (the distance between the bottom of the lowered portions and the deck—bottom of the convex deck cover), and even more preferably is within the range of 44% to 46% of the height of the side profile of the hull. A vertical center of gravity within these preferred ranges is achieved by appropriate positioning of the components in the interior of the hull, in particular by placing heavy components such as the batteries for the electric motor in the lowered hull sections. This low center of gravity adds to stability and helps to prevent capsizing.

The raised convex deck cover which covers the interior of the hull on the top side provides buoyancy at the upper portion of the boat, helping to maintain the boat in an upright position and allowing the bait boat to right itself in the event it is overturned. The radio receiver antenna may advantageously be mounted inside the raised deck cover, which provides a stable mounting area and enhances radio reception. Furthermore, an on-off power switch and charging connections for the batteries may be advantageously and conveniently mounted in the raised deck cover, with a watertight sealed cover protecting them while allowing easy access.

The placement of the propeller and the rudder in the recessed channel protects these components from being damaged when run aground or operated in very low water conditions. According to a further advantageous embodiment of the present invention, a removable plate is provided which may be mounted to cover a portion of the recessed channel, particularly in the area of the propeller and the rudder, to provide additional protection from objects which could damage or become entangled in the propeller or the rudder. This plate not only protects the propeller and the rudder, but also advantageously improves the directional effect of the propeller, since the plate effectively forms a tunnel for the propeller. The plate may extend along the entire longitudinal length of the recessed channel, forming a complete propeller tunnel. As an alternative to a propeller, the boat may use a jet drive, such as the type used on a jet ski, for propulsion.

According to a further advantageous embodiment of the present invention, an removable screen is provided which may be placed in the recessed channel in front of the propeller, further protecting the propeller and the rudder from becoming entangled in grass or weeds, when operating in environments with such hazards. The screen may be extended to the rear side of the propeller, in order to prevent entanglement with the fishing lines when the bait boat is operating in reverse. When operating in environments in which there is no danger of entanglement, the screen may be removed.

Although various materials are known in the art and may be used, in the present invention the hull is preferably molded of thermoplastic, and may include fiberglass, wood, plastic, and/or metal components.

The present invention further securely protects the bait as it is being transported to the desired fishing location, and allows easy and reliable release the bait at the desired location. The user places the bait, e.g., a baited hook or an artificial lure, which is attached to a fishing line, inside the bait storage compartment, which is then closed by a hatch in the transom. The hatch is biased toward a closed position, for example by a spring, elastic element such as a rubber band, or a magnetic latch. Alternatively or additionally to being biased toward a closed position, the hatch may be seated in a detent when in a closed position, which detent frictionally engages the hatch to hold it in a closed position. The fishing line is mounted on a support system which remains with the user, e.g., on a fishing rod and reel assembly. The user directs the fishing bait boat to the desired fishing location by using a known radio transmitter, preferably hand-held, which transmits radio signals to a radio receiver and control unit on the fishing bait boat to control the speed and direction of rotation of the propeller and the direction of the rudder. Such a radio transmitter and radio receiver/control unit are well known in the art, as evidenced by the aforementioned references, and accordingly are not described in further detail here. Once the fishing bait boat has reached the desired fishing location, the user simply tugs on the fishing line, pulling the bait out of the bait storage compartment through the hatch. Two or more bait storage compartments with hatches may be provided, allowing the user to deliver multiple fishing lines to multiple locations, if desired. Furthermore, since the bait and attached fishing lines may be pulled completely free of the bait boat, after dropping off the bait the user may bring the bait boat back to reload further baited fishing lines.

As an alternative to pulling the bait completely free of the bait boat, the user may attach a separate trolling line to the bait and to a quick release fixture mounted on the hull, preferably on the transom, to carry the bait at a predetermined depth below the bait boat. The bait is placed in the bait storage compartment as previously described. Once the bait boat has reached the desired location for beginning to troll, the bait is pulled out through the hatch by a tug on the fishing line. The bait remains attached to the bait boat via the trolling line connected to the quick release fixture, settling to a depth below the bait boat limited by the length of the trolling line. The trolling line is pulled free of the quick release fixture when the force on the trolling line reaches the preset release force of the quick release fixture. The quick release fixture is preferably adjustable, such as the type manufactured by Dubro Corporation for deep sea fishing, which has a set screw for adjusting the amount of force required to release the trolling line from the quick release fixture. In this way, the quick release fixture may be adjusted for various fishing conditions.

When fishing in the surf or on rivers, particularly when a boat is not available for retrieval, it is suggested that the bait boat be operated with a safety line attached, so that the boat can be retrieved in the event of radio trouble, battery rundown or other failure. It is recommended that a floating type of safety line be used to reduce the possibility of the safety line becoming entangled with the fishing lines. However, when fishing in lakes, ponds, or other enclosed water bodies, the bait boat may be operated without a safety line.

Other objects, advantages and novel features of the present invention will become apparent from the following detailed description of the invention when considered in conjunction with the accompanying drawings.

DETAILED DESCRIPTION OF THE DRAWINGS

Figure 1:
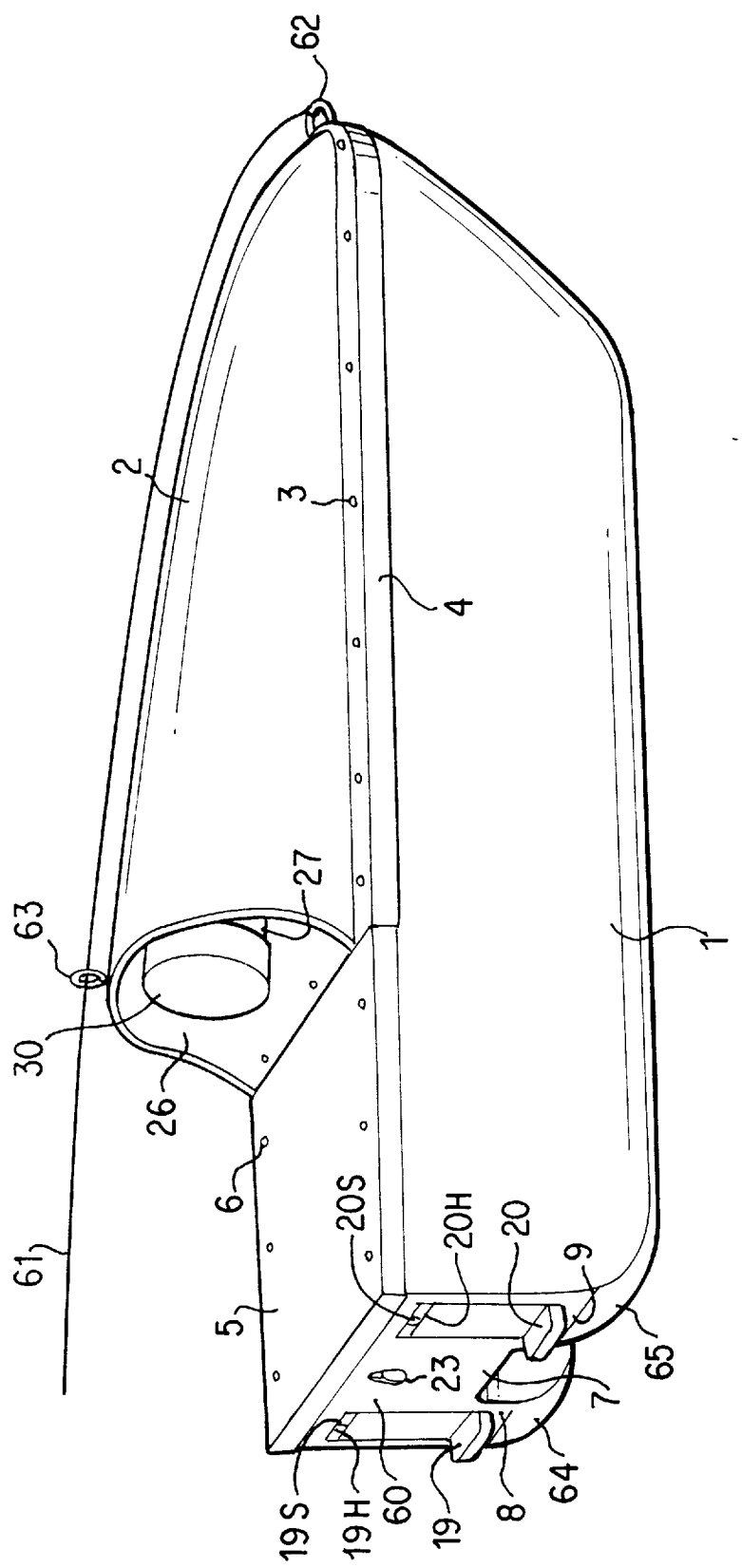
FIG. 1 is an elevated perspective view of a fishing bait boat according to a preferred embodiment of the present invention.
Figure 2:
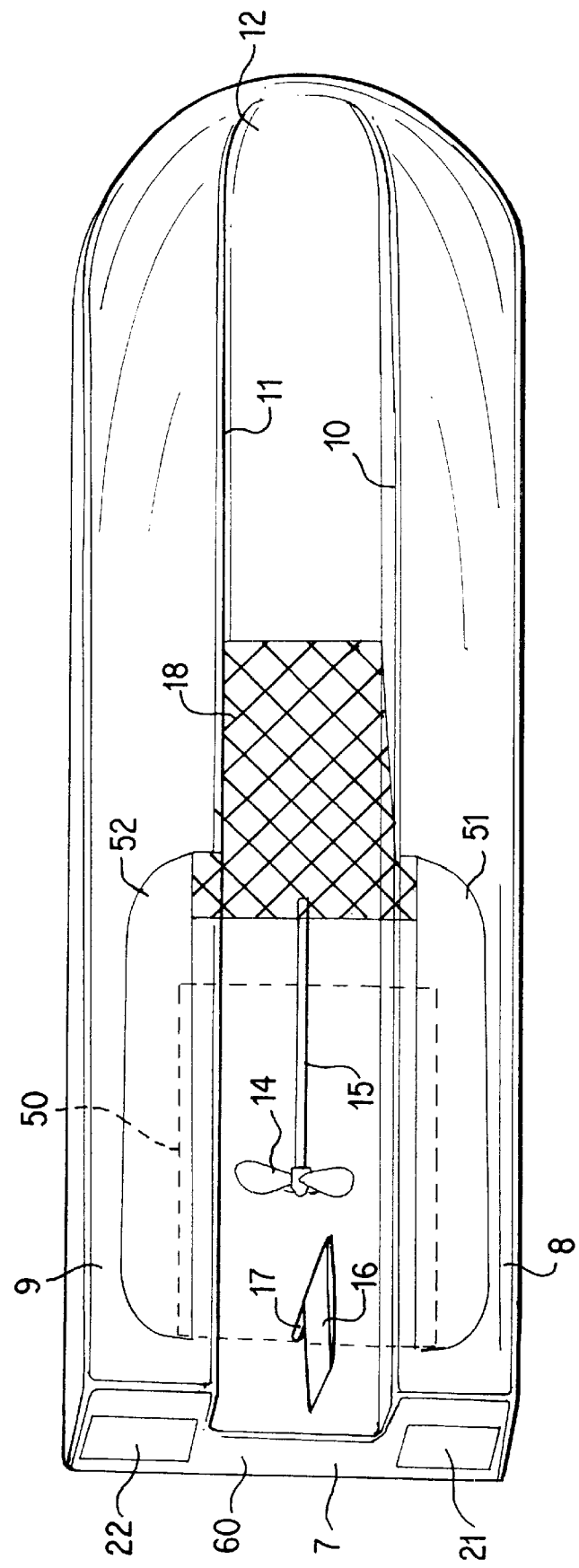
FIG. 2 is a bottom view of the fishing bait boat of FIG. 1.

Referring to FIG. 1, the fishing bait boat includes a hull 1 which is molded from thermoplastic, and a convex deck cover 2 which is removably attached to a front top portion of the hull with connectors 3, such as screws. The longitudinal sides of the hull 1 and the transom 60 slope outward 2° from bottom to top to allow the hull to be molded. A lip 4 of the deck cover 2 surrounds the periphery of the deck cover, to provide a waterproof seal between the deck cover and the hull. A rear cover 5 is attached to a rear top portion of the hull with connectors 6, such as screws, and sealingly abuts the deck cover 2. The rear cover 5 may optionally be made integrally in one piece with the hull 1 or the deck cover 2. A safety line 61 may be attached to the boat to retrieve the boat in the event of radio trouble, battery rundown or other failure. The safety line 61 is attached to a bracket 62 at the bow and runs aft to a quick release fixture 63 mounted on the highest point on the convex deck cover 2. The quick release fixture 63 may also be used for trolling, i.e., holding a trolling line which is attached to the bait, when a safety line is not being used.

The hull 1 includes a longitudinal central hull section 7 and a pair of longitudinal lowered hull sections 8, 9 located on opposite lateral sides of the central hull section. The lowered hull sections 8, 9 have a generally rectangular cross section over a majority of their length. As shown in FIG. 1, each lowered hull section 8, 9 may be formed with a respective radius 64, 65 sloping upwardly at the transom 60. The radius of curvature of radii 64, 65 is approximately 3 inches in the illustrated preferred embodiment. The radii 64, 65 improve the manufacturability of the hull, particularly in molding processes. Inwardly facing walls 10, 11 of the lowered hull sections 8, 9 and a lower wall 12 of the central hull section 7 define a recessed channel 13 having a generally rectangular cross section, as shown in FIGS. 1–5. Alternatively, the lower wall 12 of the central hull section 7 may be curved convexly upwardly toward the interior of the hull as shown at location 66 in FIG. 6, in which case the recessed channel 13 defines a generally inverted U-shaped cross section. Such an inverted U-shaped cross section improves the manufacturability of the hull, particularly in molding processes. The lower surface of the hull is essentially parallel to the deck.

A propeller 14 is arranged in the recessed channel 13, mounted on a propeller shaft 15 which extends through the lower wall 12 of the central hull section 7 into the interior of the hull. A rudder 16 is arranged in the recessed channel 13 behind the propeller 14, having a rudder shaft 17 extending through the lower wall 12 of the central hull section 7 into the interior of the hull. A plate 50, shown in broken lines, is mounted at the bottom of the recessed channel 13 extending between mounting portions 51, 52 of the longitudinal lowered hull sections 8, 9. The plate 50 protects the propeller 14 and rudder 16 from damage. Alternatively or additionally to the plate, a removable screen 18 is attached in front of the propeller 14 and the rudder 16, extending from the lower wall 12 of the central hull section 7 to the mounting portions 51, 52. The screen helps to prevent the propeller and rudder from being entangled in weeds or the like. Although not shown for purposes of clearly showing the propeller, the screen may extend to the rear of the propeller 14, and may completely enclose the recessed channel 13, which further helps to avoid entanglement with the fishing lines when the boat is in reverse.

A pair of hatches 19, 20 are provided in the transom 60 (rearwardly facing hull end) in each of the lowered hull sections 8, 9, respectively, providing access to bait storage compartments 21, 22 in the interior of the hull. The bait storage compartments 21, 22 are covered on a top side by the rear cover 5. The hatches 19, 20 are pivotably mounted on sliding hinges 19H, 20H having springs or elastic elements 19S, 20S to bias the hatches toward the closed position shown in FIG. 1. The hatches 19, 20 are opened by pivoting the hatches upwardly about the hinges 19H, 20H. The hinges 19H, 20H are mounted in longitudinal channels along the upper end of the bait storage compartments 21, 22 such that the hatches 19, 20 may be slid into the bait storage compartments 21, 22 along an upper side to hold the hatches 19, 20 in the open position shown in FIG. 4.

One or more quick release fixtures 23 may be mounted on the transom 60 to carry one or more lines, for example for trolling. The quick release fixture 23 is made of plastic with two facing portions 24, 25 which are elastically biased toward each other. A trolling line, which is separate from the fishing line on the user's rod and reel, is used to limit the bait to a predetermined trolling depth below the bait boat. One end of the trolling line is frictionally held between the two facing portions 24, 25 of the quick release fixture 23. The other end of the trolling line is connected to the bait, which is initially located in at least one of the bait storage compartments 21, 22. Once the bait boat has reached a desired location for beginning to troll, the user tugs on the fishing line to pull the bait out of the bait storage compartments 21, 22 into the water. The bait then sinks below the bait boat, limited in depth by the length of the trolling line which is attached to the bait and to the quick release fixture 23. The bait will remain attached to the bait boat until a force is applied to the trolling line which equals or exceeds the breakaway force required to release the trolling line from the quick release fixture 23. Such a force may be applied to the trolling line by a fish which has taken the bait, or may be applied by the user through the fishing line which is connected to the bait and to the user's rod and reel assembly. An adjustment screw on the quick release fixture 23 allows the breakaway force required to release the trolling line to be adjusted as desired. Other quick release fixtures are known in the art and may be used according to other preferred embodiments.

Figure 4:
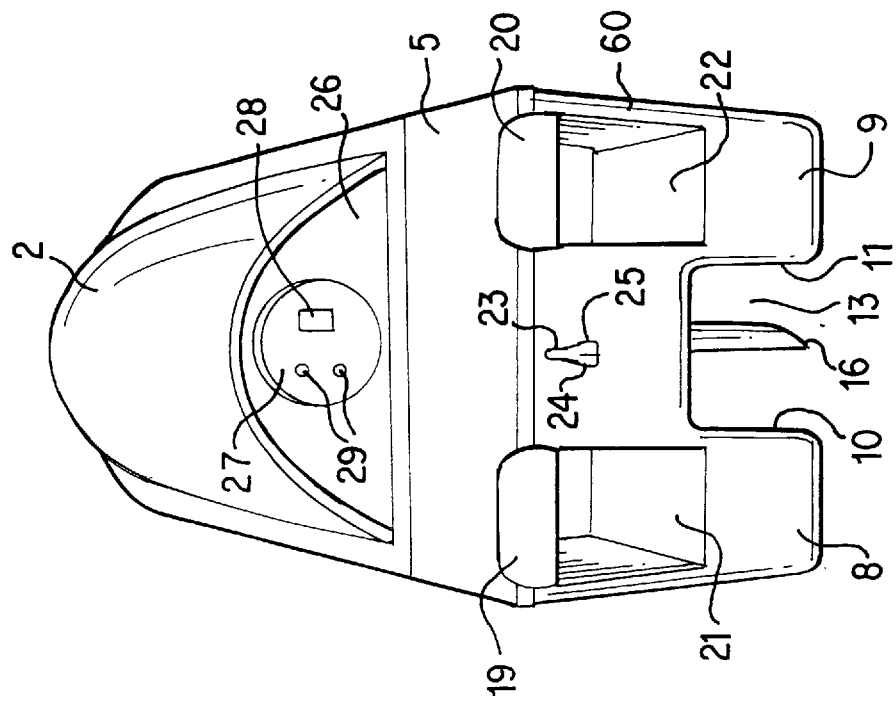
FIG. 4 is a rear view of the fishing bait boat of FIG. 1.
Figure 3:
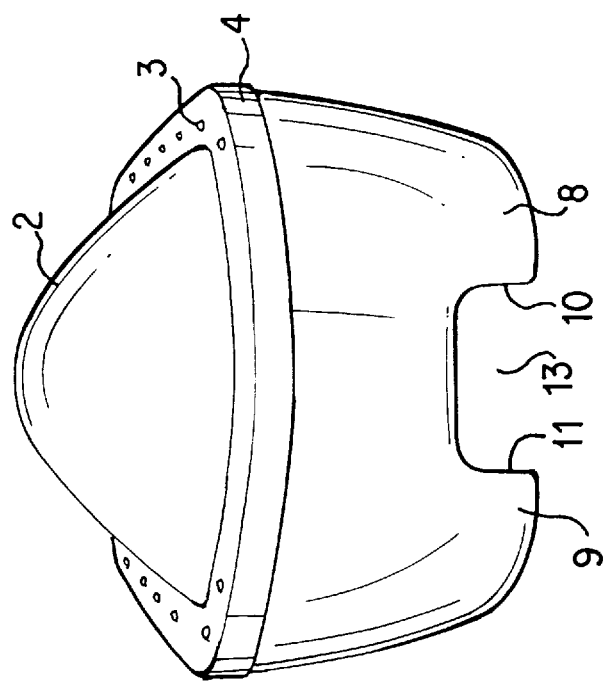
FIG. 3 is a front view of the fishing bait boat of FIG. 1.

As shown in FIG. 4, the deck cover 2 has a recessed area 26 at its rear end in which a circular connection flange 27 is mounted. A power switch 28 and battery charging terminals 29 are mounted in the connection flange 27. A cap 30 (FIG. 1) is provided which can be placed over, e.g., pressed on, snapped on, or threaded over, the connection flange 27 to provide a waterproof seal.

Figure 5:
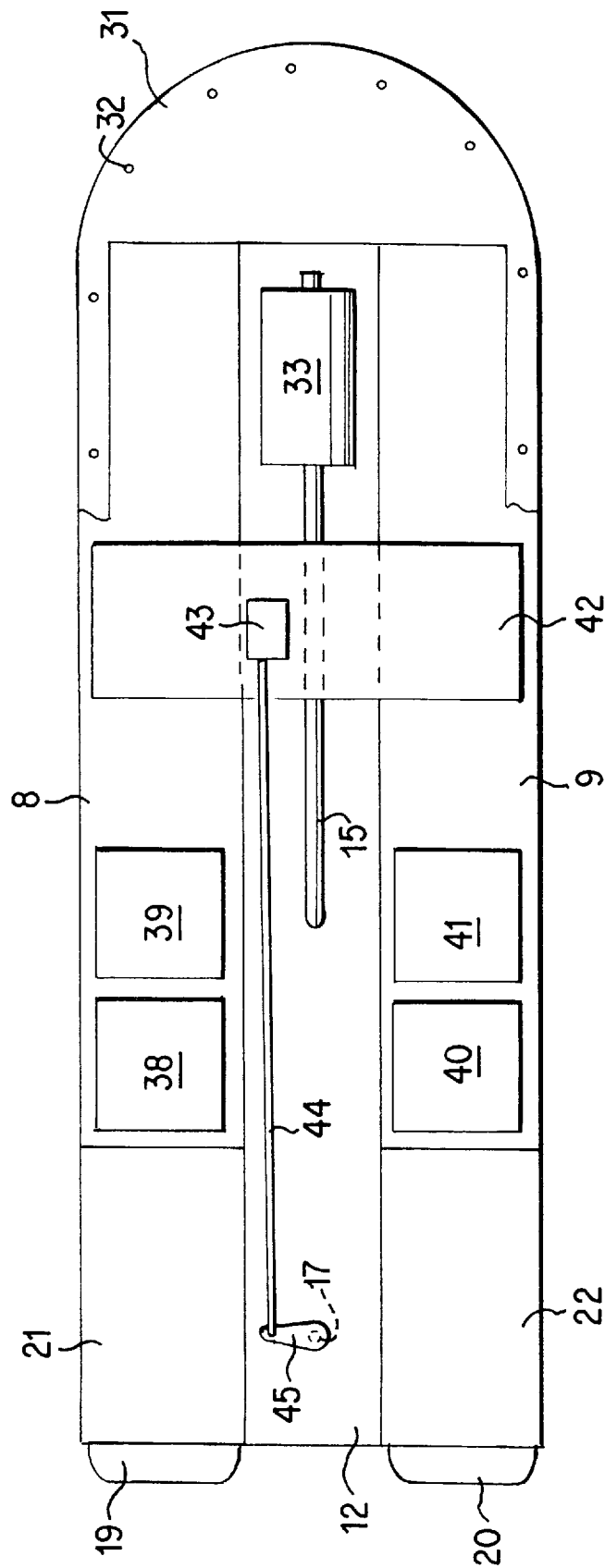
FIG. 5 is a top view of the fishing bait boat of FIG. 1 with the deck cover removed.

FIG. 5 shows a top view of the bait boat with the deck cover 2 and rear cover 5 removed, exposing the interior of the hull 1. A supporting framework 31 made of wood, fiberglass and/or plastic is inserted in the hull 1, only part of which is shown. The supporting framework 31 has connection holes 32 for the connectors 3, 6 (FIG. 1) for connection to the deck cover (not shown) and rear cover (not shown). The output shaft of an electric motor 33 is connected to the propeller shaft 15, which extends through the lower wall 12 of the central hull section 7 from the recessed channel 13. Four 12-volt batteries 38–41 are arranged essentially symmetrically in the interior of hull, with two of the batteries in each of the lowered hull sections 8, 9. Since the batteries are below the lower wall 12 of the central hull section 7, the center of gravity of the bait boat is lowered. Although any size batteries may be used, in a preferred embodiment the batteries each weigh approximately 3.25 pounds.

A waterproof control package 42 is mounted in the interior of the hull. The control package 42 includes a radio receiver which is connected with an antenna mounted in the deck cover 2, controls for controlling the speed and direction of rotation of the electric motor 33, and an electric servo motor 43 for controlling the angle of the rudder 16. The servo motor 43 moves a rudder linkage 44, 45 to rotate the rudder shaft 17, which extends through the lower wall 12 of the central hull section 7 into the interior of the hull from the recessed channel 13. The radio receiver of the controller 42 receives radio signals transmitted by the user from a hand held radio transmitter (not shown). The electric motor 33 can be varied between a very slow trolling speed and a high speed for penetrating the surf. The radio transmitter, the antenna, and the controller are all well known in the art, as evidenced by the references cited above, and accordingly are not explained in further detail here.

To use the fishing bait boat, the user opens the hatches 19, 20, then places baited fishing lines in the bait storage compartments 21, 22, and then closes the hatches 19, 20. The fishing lines remain connected to a fishing rod and reel assembly which remains with the user. If the user wishes to troll with the baited fishing lines being pulled along with the bait boat, the user connects one end of one or more trolling lines to the baited fishing lines, connecting the other end of the trolling lines to the one or more quick release fixtures 23. The trolling lines having a length corresponding to a desired trolling depth.

The user removes the cap 30 from the connection flange 27 and powers up the controller 42 by turning on the power switch 28, subsequently replacing the cap 30 on the connection flange 27. The user places the bait boat in the water to be fished, and then guides the bait boat to a desired fishing location using a hand held radio transmitter which sends radio signals which are received by the antenna mounted in the deck cover 2 and relayed to radio receiver in the controller 42. Once the bait boat has reached the desired fishing location, the user then tugs on the fishing line. The force of the tug forces the hatches 19, 20 to pivot open, allowing the baited fishing line to be pulled out of the bait storage compartments 21, 22 and into the water. If trolling lines have been attached, the bait will remain attached to the bait boat via the trolling lines and the one or more quick release fixtures 23, sinking below the bait boat to a depth limited by the length of the trolling lines. When a force on the trolling lines exceeds the preset release force of the quick release fixture, for example from a fish which has taken the bait or from a tug on the fishing line from the user, the trolling lines will be pulled free from the one or more quick release fixtures 23, completely freeing the baited fishing line from the bait boat.

Figure 6:
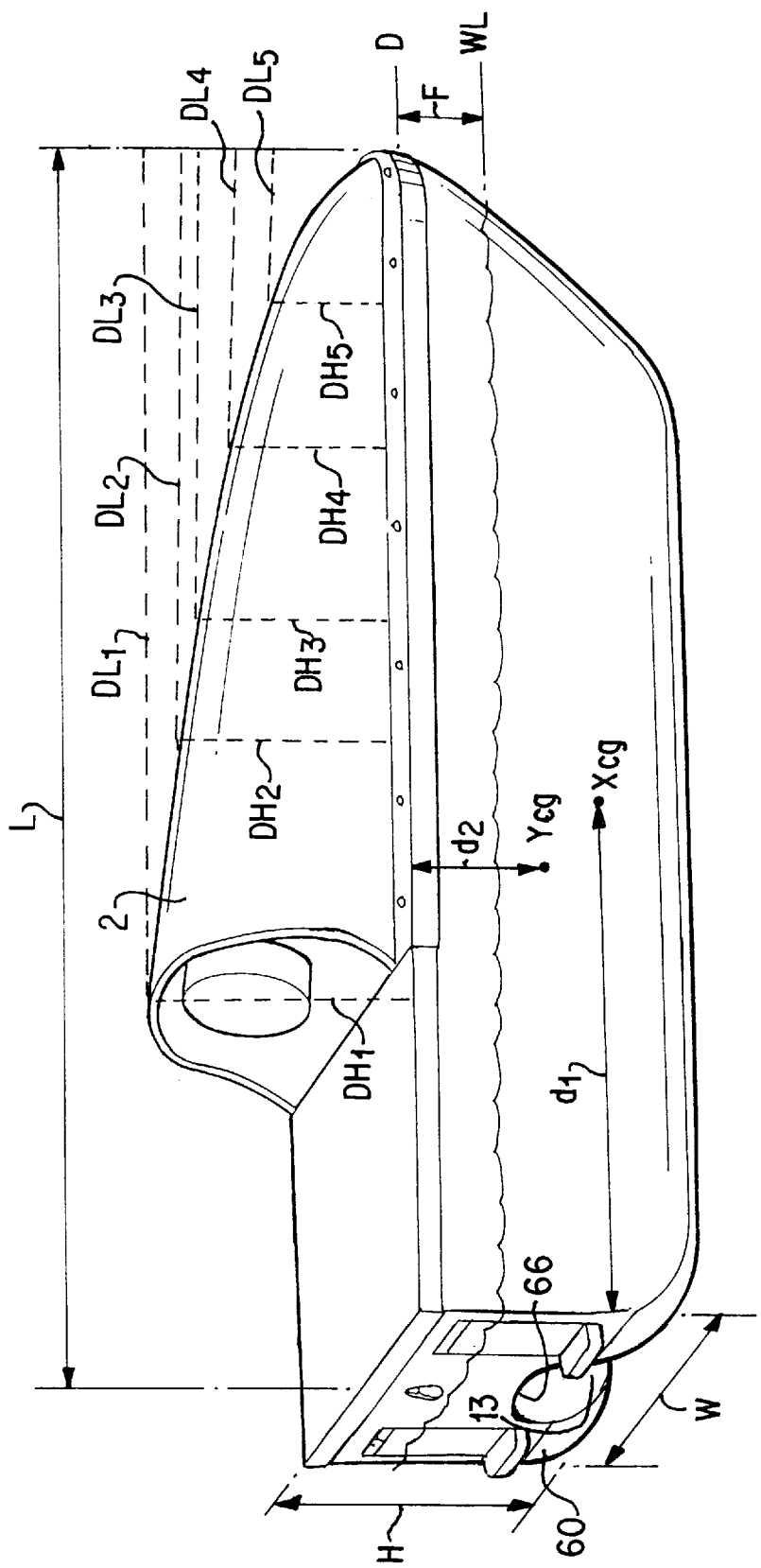
FIG. 6 is an elevated perspective view showing the dimensions of the fishing bait boat.

Referring to FIG. 6, a preferred embodiment of the fishing bait boat has the following dimensions. The fishing bait boat has a length L of approximately 33 inches, a width W of approximately 10 inches, and a side profile height H from the bottom of the lowered hull sections to the bottom of the deck D of approximately 7 inches. The convex deck has a height $DH_1$ of 3.75 inches at the rear end, which is located a distance $DL_1$ of 22 inches from the front of the boat. The convex deck has a height $DH_2$ of 3.5 inches, which is located a distance $DL_2$ of 14 inches from the front of the boat. The convex deck has a height $DH_3$ of 3.25 inches, which is located a distance $DL_3$ of 10 inches from the front of the boat. The convex deck has a height $DH_4$ of 2.5 inches, which is located a distance $DL_4$ of 7 inches from the front of the boat. The convex deck has a height $DH_5$ of 1.75 inches, which is located a distance $DL_5$ of 4 inches from the front of the boat.

The recessed channel 13 has a width of approximately 3 inches and a height of approximately 3 inches. The freeboard F, i.e., the distance between the water line WL and the deck D, is within the range of 14% to 43% of the height H, and even more preferably is within the range of 30% to 40% of the height H. The longitudinal center of gravity, $x_{cg}$, of the boat is located at a distance $d_1$ from the transom 60 which is within the range of 35% to 45% of the length L, and even more preferably is within the range of 38% to 40% of the length L. The vertical center of gravity, $y_{cg}$, of the boat is located at a distance $d_2$ below the deck D which is within the range of 40% to 50% of the height H, and even more preferably is within the range of 44% to 46% of the height H.

Figure 7:
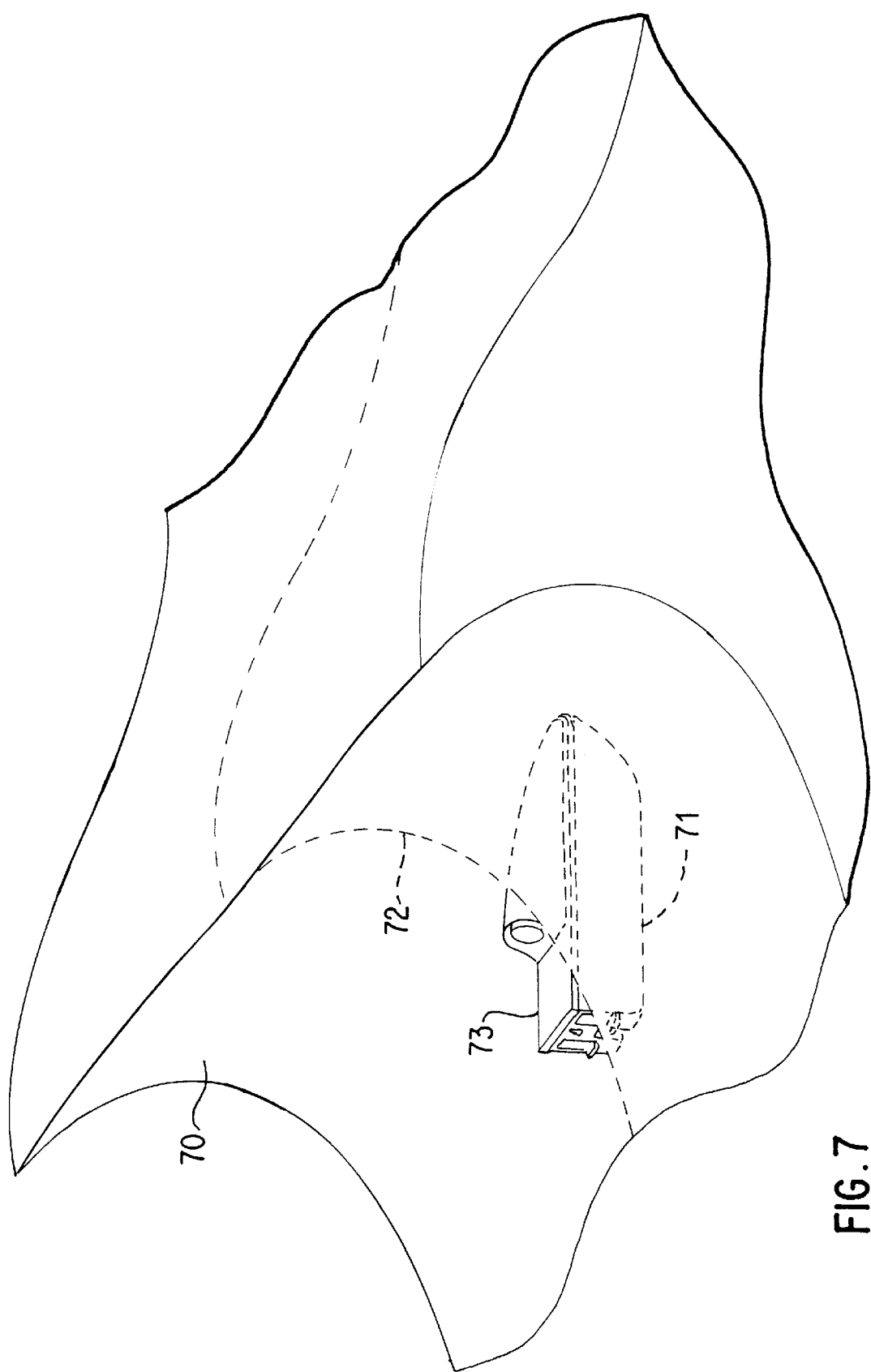
FIG. 7 is a schematic view of the fishing bait boat of FIG. 1 breaking through a wave.

As shown in FIG. 7, the weight distribution and hull design of the present invention allow the bait boat to duck under a breaking wave 70, rather than riding up on the crest of the wave which would hinder progress and could cause the boat to capsize. The portions of the boat shown in broken lines 71 have entered into the face of the breaking wave at the wave line 72 shown in broken lines, while the portions of the boat shown in solid lines 73 have not yet entered the wave. By travelling through the breaking waves rather than over the top of them, the boat can effectively and stably deliver a baited fishing line to a desired fishing location. The convex deck overcomes the lift moment of the bow, providing horizontal stability as the boat enters the wave. The force of the breaking water against the convex deck provides a downward force which counteracts the lift of the bow, so that the boat will maintain a generally horizontal attitude to penetrate the breaking water, rather than riding up on the wave. When the fishing bait boat becomes completely submerged, the buoyancy of the convex deck provides lift at the front of the boat to direct the boat back to the surface. The convex deck also increases the buoyancy and shifts the center of gravity when submerged to maintain the boat in an upright position.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A radio controlled fishing bait boat comprising:

a hull including a longitudinal central hull section having a lower wall, a pair of longitudinal lowered hull sections located on opposite lateral sides of said central hull section, respectively, and a rear transom, said lowered hull sections extending downwardly from said lower wall and defining a recessed channel therebetween, said hull defining an interior space, said transom including at least one hatch providing access to a bait storage compartment in said interior space;

a deck cover attached to the hull and arranged to cover said interior space;

a propeller arranged in said recessed channel, said propeller being operatively connected with an electric motor arranged in said interior space of the hull;

a rudder arranged in said recessed channel;

at least one battery arranged in said interior space of the hull and connected to said electric motor; and a control unit arranged in said interior space of the hull, said control unit operatively connected to control said propeller and said rudder in response to radio signals received by a radio receiver.

2. A fishing bait boat according to claim 1, further comprising a plate mounted at the bottom of said recessed channel approximately below said propeller and said rudder, said plate extending between and over said lowered hull sections.

3. A fishing bait boat according to claim 2, further comprising a screen mounted in said recessed channel in front of said propeller, said screen extending between and over said lowered hull sections.

4. A fishing bait boat according to claim 1, further comprising a screen mounted in said recessed channel in front of said propeller, said screen extending between said lowered hull sections.

5. A fishing bait boat according to claim 1, wherein said at least one battery is arranged in said interior space of the hull in said lowered hull sections.

6. A fishing bait boat according to claim 1, wherein at least a portion of said deck cover is configured to extend convexly above said hull.

7. A fishing bait boat according to claim 1, wherein said control unit includes an electric servo motor which is operatively connected to the rudder by a mechanical linkage.

8. A fishing bait boat according to claim 1, further comprising at least one quick release fixture mounted on said hull, said quick release fixture being configured to releasably hold a fishing line.

9. A fishing bait boat according to claim 8, wherein said quick release fixtures are mounted on said transom proximate said at least one hatch.

10. A fishing bait boat according to claim 1, wherein said at least one hatch is pivotably mounted on a hinge at an upper portion of the bait storage compartment, said hinge being spring-loaded to bias the at least one hatch toward a closed position.

11. A fishing bait boat according to claim 1, wherein a connection flange is provided in said deck cover, said connection flange including at least one of a power switch and battery charging terminals.

12. A fishing bait boat according to claim 1, wherein said lowered hull sections have a generally rectangular cross section.

13. A fishing bait boat according to claim 1, wherein said recessed channel has a generally rectangular cross section.

14. A fishing boat according to claim 1, wherein said lower wall of the longitudinal central hull section is curved convexly toward said interior space, such that said recessed channel has an inverted U-shaped cross section.

15. A fishing bait boat according to claim 1, wherein a distance between the water line of the boat and the deck is within the range of 14% to 43% of the height between the bottom of the lowered hull sections and the deck.

16. A fishing bait boat according to claim 1, wherein the longitudinal center of gravity of the boat is located a distance from the rear transom which is within the range of 35% to 45% of the length of the boat.

17. A fishing bait boat according to claim 1, wherein the vertical center of gravity of the boat is located a distance below the deck which is within the range of 40% to 50% of the height between the bottom of the lowered hull sections and the deck.

* * * * *